US005612399A

United States Patent [19]
Beckley et al.

[11] Patent Number: 5,612,399
[45] Date of Patent: *Mar. 18, 1997

[54] PROCESSABLE SILICONE COMPOSITE MATERIALS HAVING HIGH TEMPERATURE RESISTANCE

[75] Inventors: Don A. Beckley, Newport Beach; John Stites, Huntington Beach, both of Calif.

[73] Assignee: Hitco Technologies, Inc., Gardena, Calif.

[ * ] Notice: The term of this patent shall not extend beyond the expiration date of Pat. No. 5,552,466.

[21] Appl. No.: 462,073

[22] Filed: Jun. 5, 1995

Related U.S. Application Data

[62] Division of Ser. No. 356,559, Dec. 15, 1994, Pat. No. 5,552,466, which is a continuation of Ser. No. 169,505, Dec. 17, 1993, abandoned.

[51] Int. Cl.$^6$ ........................................................ C08K 5/24
[52] U.S. Cl. ........................ 524/261; 524/265; 501/88; 501/92; 428/447
[58] Field of Search ........................... 525/477; 524/261, 524/265; 501/88, 92; 428/447

[56] References Cited

U.S. PATENT DOCUMENTS

| | | | |
|---|---|---|---|
| 4,357,436 | 11/1982 | Zucker et al. | 524/448 |
| 4,652,618 | 3/1987 | Sumida et al. | 525/477 |
| 4,686,135 | 8/1987 | Obayashi et al. | 428/265 |
| 4,714,650 | 12/1987 | Obayashi et al. | 428/265 |
| 4,822,659 | 4/1989 | Anderson et al. | 428/99 |
| 4,865,907 | 9/1989 | Julis et al. | 428/241 |
| 4,865,911 | 9/1989 | Blizzard | 525/31 |
| 5,026,766 | 6/1991 | Sasaki | 525/477 |
| 5,030,699 | 7/1991 | Motoyama et al. | 525/477 |
| 5,175,057 | 12/1992 | Wengrovius et al. | 525/477 |

FOREIGN PATENT DOCUMENTS

| | | | |
|---|---|---|---|
| 0091104A1 | 10/1983 | European Pat. Off. | C08G 77/52 |
| 2451387 | 3/1980 | France | C08L 83/04 |
| 1142772 | 2/1969 | United Kingdom | C04B 35/00 |
| WO95/12635 | 5/1995 | WIPO | C08K 5/11 |

OTHER PUBLICATIONS

Encyclopedia of Polymer Science and Engineering, John Wiley and Sons, vol. 15, pp. 224–225 (1989).
Ronald Baney and Grish Chandra, "Preceramic Polymers", pp. 889–902 *Silicones Chemistry and Technology*, Bayer et al., eds., CRC Press, Boca Raton, 1991.
Concise Dictionary of Physics and related subjects, Second Edition, Pergamon Press, NY, p. 288 (1979).
Grant and Hackh's Chemical Dictionary, 5th ed., McGraw–Hill Book Co. NY, pp. 238 and 508 (1957).
Encyclopedia of Polymer Science and Engineering, vol. 11, John Wiley and Sons Inc., pp. 381–383 (1988).
The American Heritage Dictionary, Second College Edition, p. 1121 (1982) Houghton–Mifflin; Boston.
European Search Report No. 95 905421 dated 12 Jun. 1996.

*Primary Examiner*—Melvyn I. Marquis
*Attorney, Agent, or Firm*—Renner, Kenner, Greive, Bobak, Taylor & Weber

[57] ABSTRACT

A processable blend having high temperature and thermal shock resistance properties includes a resin blend which includes at least one first silicone polymer and at least one second silicone polymer. The processable blend is ceramitizable at a temperature above about 1100° F. A method of producing an article with high temperature and thermal shock resistance properties includes forming a silicone blend of at least one first silicone polymer and at least one second silicone polymer, wherein the blend is ceramitizable at a temperature above about 1100° F.; forming the blend into the shape of the desired article; and, at least partially curing at least one of said silicone polymers at a temperature below the ceramitization temperature.

17 Claims, No Drawings

PROCESSABLE SILICONE COMPOSITE MATERIALS HAVING HIGH TEMPERATURE RESISTANCE

RELATED APPLICATION

This application is a division of U.S. patent application Ser. No. 08/356,559 filed Dec. 15, 1994, U.S. Pat. No. 5,552,466, which is a continuation of U.S. patent application Ser. No. 08/169,505, filed Dec. 17, 1993, now abandoned.

TECHNICAL FIELD

This invention generally relates to a processable and curable composite material which possess high thermal stability upon exposure to high temperatures. More particularly, the composite material includes a curable blend of a first silicone polymer and a second silicone polymer, which blend will ceramitize upon exposure to high temperatures.

BACKGROUND OF THE INVENTION

It is known in the art to provide ceramic materials for use in applications requiring high thermal stability. One of the major drawbacks with ceramic materials however, is that they are not easily processed using conventional techniques. Ceramics are generally known to have high softening temperatures, and therefore, are not as easily shaped as compared to organic polymers having lower softening temperatures, which are often melt processed. Therefore, ceramic materials are usually machined or otherwise mechanically shaped before they are employed. Ceramic, metal and some polymer processing requires extreme conditions (temperature and pressure) or complicated equipment for processing, and therefore, experience a higher scrap rate.

Because of the processability problems with ceramic materials, it is known to process ceramic precursors to a desired shape, and then pyrolyze the precursor to form a ceramic material. However, many ceramics are brittle and therefore, not useful for applications where structural integrity is required.

Silicone based laminating materials are also known in the art. However, these materials, including silicone based ceramics, suffer the same poor processability characteristics of other ceramics. In addition, silicone laminating materials are also often brittle and subject to delamination. Further, silicone laminating materials generally are known to have limited thermal protection characteristics and limited resistance to thermal shock.

Thermal shock is generally understood to mean the stresses induced when a material is suddenly exposed to a higher temperature than its pre-exposed temperature. Many insulating materials are capable of withstanding high temperatures, including many ceramics. Hence, ceramics are often employed to make articles requiring at least a certain degree of heat resistance. If the temperature rise is gradual, many ceramics will effectively function as an insulator.

However, when the surface of an insulating material is subjected to a sudden temperature rise over a short period of time, such as from a substantially instantaneously applied flame or the like, the surface of the material will expand due to the temperature rise. The core of the material however, often remains at the ambient temperature, at least for a sufficient amount of time such that it will not expand as the surface is expanding. The effect of this temperature gradient within the materials, is that the material is stressed due to the unequal expansion rates, and cracks or the like can occur therein if the stresses are greater than the strength of the material. Thermally induced stresses can be represented by the following formula:

$$\text{Thermal stress} = \alpha L \Delta T = \Delta \epsilon E$$

where $\alpha$ is the linear thermal expansion coefficient of the material; L is the finite element length; $\Delta T$ is the thermal gradient across the material; $\Delta \epsilon$ is the thermal strain; and, E is the modulus of the material.

Because of the sudden exposure to an increased temperature, it is common to refer to a material's ability to withstand a sudden temperature increase as its resistance to "thermal shock". Monolithic materials which are known to crack upon sudden exposure to high temperatures include silica, quartz, alumina, zirconia and graphite.

Phenolic resin-based composites are known to provide high temperature resistance due to their ability to ablate, i.e., produce an insulating char. However, the char has poor mechanical characteristics and these composites have only limited uses. Carbon/carbon composites also have good thermal stability, but are known to have poor resistance to oxidative atmospheres and are difficult to fabricate. Ceramic-based materials have good thermal stability, but as discussed above, are difficult to process and have poor resistance to thermal shock.

A need exists therefore, for a processable material which possesses high thermal resistance properties, good structural properties, resistance to thermal shock and which is processable by conventional techniques.

SUMMARY OF INVENTION

It is therefore an object of the present invention to provide a material which will provide high temperature resistance and thermal shock resistance in a given application.

It is another object of the present invention to provide a material which will provide high temperature resistance and thermal shock resistance in a given application and which can be processed by conventional techniques.

It is a further object of the present invention to provide an organic polymer having oxidation stability.

It is still another object of the present invention to provide a method for producing an article with high temperature and thermal shock resistance properties.

It is yet another object to provide a method for producing an article with high temperature and thermal shock resistance properties, employing conventional processing techniques.

The foregoing objects, together with the advantages thereof over the known art relating to thermal protection materials which shall become apparent from the specification which follows, are accomplished by the invention as hereinafter described and claimed.

In general, a processable blend having high temperature and thermal shock resistance comprises at least one high viscosity silicone polymer and at least one lower viscosity silicone polymer. The blend is ceramitizable at a temperature above about 1100° F. (590° C.).

There is also provided according to the present invention, a method of producing an article with high temperature and thermal shock resistance comprising forming a blend of at least one high viscosity silicone polymer and at least one lower viscosity silicone polymer, wherein the blend is ceramitizable at a temperature above about 1100° F. (590° C.); and, at least partially curing at least one of the silicone polymers at a temperature below the ceramitization temperature.

An article according to the invention contains a layer of material formed from a silicone blend. The silicone blend comprises a silsesquioxane component comprising at least one silsesquioxane polymer and at least one polydiorganosiloxane component. The resin blend is ceramitizable at a temperature above about 1100° F., and at 25° C. the silsesquioxane component has a viscosity of about 500,000 centipoise and above and the polydiorganosiloxane component had a viscosity of from about 10 to about 100 centipoise.

PREFERRED EMBODIMENT FOR CARRYING OUT THE INVENTION

There is provided, according to the present invention, a material having high temperature and thermal shock resistance properties. The material includes a blend of silicone polymers, at least one of which may be at least partially cured to provide the material with structural integrity. Upon exposure to high temperatures, such as for example, above about 1100° F. (590° C.), at least one of the silicone polymers ceramitizes, providing the material with high temperature and thermal shock properties for an extended lifetime relative to conventional materials.

Because the blend is not a ceramic until exposure to high temperature causing ceramitization, it is processable by conventional means, techniques and apparatus. For example, the blend may be laminated to an article, such as a fire door or the like, and then cured, thus providing the door with the desired property of thermal resistance. The blend may also be formed into a desired shape, such as a tile or the like, cured and then affixed to an article to provide the desired properties. The specific order of the steps of preparing the blend, curing, shaping and/or affixing are not necessarily limitations of the present invention.

The blends according to the present invention include at least one first silicone polymer, at least one second silicone polymer, and optionally a filler material. Fibrous reinforcement members are also optionally yet preferably added to the blend. Furthermore, the blend is ceramitizable at a temperature above about 1100° F. (590° C.).

Preferably, the first silicone polymer has a viscosity of about 500,000 centipoise (cp) and above at "ambient" or room temperature of about 25° C. (Viscosities as provided herein are determined using a standard Brookfield viscometer.) That is, it is preferably a solid at room temperature, and therefore, may be relatively termed as the more "high viscosity" or the more "rigid" polymer. The first polymer is preferably a silsesquioxane polymer having the general structural repeating unit $RSiO_{3/2}$ where R is either a methyl or a phenyl group or a mixture of both. The silsesquioxane is believed to have a number of structures, including the following:

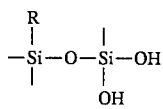

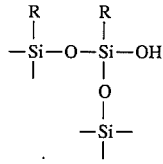

and,

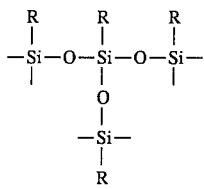

Preferably, the second silicone polymer has a lower viscosity of from about 10 to about 1000 cp at a temperature of about 25° C. This polymer is also generally characterized as having a high elongation of from about 5 to 10 percent, and the ability to completely "wet-out" the reinforcing fibers. The second silicone polymer is preferably a liquid at room temperature, and therefore can be relatively referred to as the more "flexible" polymer. Examples of useful second silicone polymers include for example, polydiorganosiloxane homopolymers such as silanol terminated polydiorganosiloxane polymers, methylsiloxane resin (that is, methyl terminated polydiorganosiloxane), and the like, as well as mixtures thereof.

As used herein, the silanol terminated polydiorganosiloxane has at least one reactive end group. An example of a silanol terminated polydiorganosiloxane is silanol terminated polydimethyl siloxane:

where the moiety in the brackets is a repeating polymer unit and "n" is an integer of from 0 to about 10,000.

Silicone polymers for use in the present invention as both the first and second silicone polymers having the respective viscosities as described above, also include silicone copolymers. Useful silicone copolymers include silicone random copolymers, silicone block copolymers and silicone-organic copolymers.

An example of a useful silicone homopolymer has the general formula

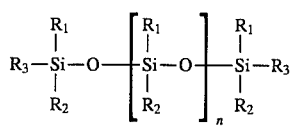

wherein $R_1$ and $R_2$ are the same or different and are hydrogen, an alkyl group having from about 1 to about 6 carbon atoms, such as methyl, ethyl and the like, a phenyl group, a vinyl group, or a halogenated alkyl, phenyl, or vinyl group as above, such as 3,3,3-trifluoropropyl; $R_3$ can be the same as $R_1$ and $R_2$ or can be an hydroxy group; and, n is an integer of from about 0 to about 10,000.

An example of a useful silicone random copolymer includes a polymer having a random distribution of dialkyl siloxane, diphenyl siloxane, dialkylphenyl siloxane, alkyl vinyl siloxane, and the like. In such random copolymers, the alkyl constituents would have from 1 to about 6 carbon atoms. Such a random copolymer can be represented by the general formula

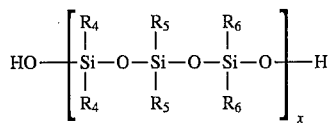

where at least one of $R_4$, $R_5$ and $R_6$ are different and are individually hydrogen, an alkyl group, an alkyl phenyl group or a vinyl group, where "alkyl" is as described hereinabove; and x is an integer of from 1 to about 10,000.

Useful silicone block copolymers include silicone blocks of different compositions. For example, a useful silicone block copolymer can be formed by reaction of linear polydimethylsiloxanes having silanol end groups with p-bis-(dimethylhydroxysilyl)benzene.

Other silicon-organic copolymers are also useful in the practice of the present invention, such as for example, silicone-polyether block copolymers.

The silicone polymers having the viscosities as discussed hereinabove, and described in *SILICONES Chemistry and Technology*, Bayer et al., eds., CRC Press, Boca Raton, 1991, which is hereby incorporated by reference for its disclosure of such polymers, are further representative of the useful polymers for practice of the present invention.

The preferred silicone polymers for practice of the invention include silicone homopolymers. Of these, polydiorganosiloxanes such as silsesquioxane, polydimethylsiloxane (methylsiloxane resin), polydiphenylsiloxane, polydiethylsiloxane, and silanol terminated polydimethyl siloxane are particularly preferred.

In order to reinforce the blend, fiber or felt reinforcement members including fibers such as glass, quartz, silica, carbon, alumina, aluminosilicate, amide, and mixtures thereof, are preferably added to the blend. The fibers can be in any structural form or architectures, including fabrics, unidirectional arrays, rovings, mats, braids, 2-dimensional fabrics, 3-dimensional fabrics, mixtures thereof, and the like. As stated above, it is preferred to use an effective amount of fibrous reinforcement members, which is the amount necessary to maintain the mechanical properties of the blend throughout the curing process. Curing will normally take place at elevated temperatures, and sufficient reinforcement should be provided to maintain the desired structural and mechanical integrity of the blends during such curing. Cured articles according to the invention which contain an effective amount of reinforcement members maintain high temperature, oxidation and thermal shock properties. The reinforcement material should give the composite laminate mechanical integrity during pyrolysis.

A preferred filler material which may also be added to the blend is a heat resistant filler material and is preferably a fibrous or particulate material, or a combination thereof. Fillers for heat resistant composites according to the invention include those conventional in the art for imparting heat resistance, such as silica, alumina, inorganic oxides, aluminosilicates such as mullite, inorganic carbides, inorganic nitrides, and mixtures thereof. The filler is preferably composed of discontinuous fiber such as whiskers, particles, and mixtures thereof.

The amount of reinforcement fibers or felts and fillers will vary according to the end use of the invention, and are therefore, not an absolute limitation thereof. It is preferred therefore, to use an amount sufficient to be effective for imparting the mechanical or thermal characteristics required for the end use application.

It is preferred to employ from about 50 to about 90 parts by weight of the first silicone polymer blended with from about 5 about 35 parts by weight of the silanol terminated polydimethylsiloxane, and optionally, from 0 to about 25 parts by weight of methylsiloxane resin (methyl terminated polydiorganosiloxane). The blend of the first and second silicone polymers will be referred to herein as the "resin blend". One example of a blend according to the invention includes about 72 parts by weight of silsesquioxane polymer having a viscosity of about 500,000 centipoise and above at 25° C.; about 10 parts by weight of methylsiloxane resin,

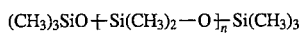

(where the moiety in the brackets is a repeating polymer unit and "n" is an integer of from 0 to 10,000) and about 18 parts by weight of a mixture containing about equal parts by weight of methylsiloxane resin and silanol terminated polydimethylsiloxane; where the methylsiloxane resin and the mixture have a viscosity of from about 10 to about 1000 at 25° C. The silsesquioxane has the general formula $RSiO_{3/2}$ as discussed hereinabove. Such a silsesquioxane is commercially available for example, from G.E. Silicones as SR-355 and is sometimes referred to as a "methylphenylsesquisiloxane".

Examples of polydiorganosiloxanes commercially available from G.E. include TRIPLUS™ TPR 178 and TPR 179. Dow Corning also provides a number of similar silicone resins under the product designations: DC-801, DC-804, DC-805, DC-806A, DC-808, DC-840, DC-2103, DC-2104, DCQ-1-2529, DCQ-1-2530, DCQ-2531, P50X AND P80X.

A filler as described above can be added to the resin blend. Preferably, from about 0 to about 375 parts by weight of a heat resistant filler in the form of discontinuous fibers, particles or mixtures thereof is added to 100 parts by weight of the resin blend. A preferred discontinuous fiber is a whisker.

If a reinforcement is employed with the resin blend, the amount of such reinforcement can vary from about 0 to about 400 parts by weight of fibrous or felt reinforcement added to 100 parts by weight of the resin blend.

As an example, a blend according to the invention and adapted for use in forming bulk molding compounds and prepreg, includes from about 50 to about 65 parts by weight of silsesquioxane and from 23 to about 35 parts by weight of silanol terminated polydiorganosiloxane (preferably silanol terminated polydimethylsiloxane). Such a blend may also include from about 12 to about 16 parts by weight of polydimethylsiloxane resin, from about 47 to about 375 parts by weight of a heat resistant filler material and from about 0 to about 27 (more preferably, about 20 to about 27) parts by weight of a reinforcement material.

An example of a blend useful for thermal and ablative protection, as well as for use in structural applications, includes from about 65 to about 67 parts by weight of silsesquioxane, from about 11 to about 23 parts by weight of silanol terminated polydiorganosiloxane, from about 12 to about 22 parts by weight of methylsiloxane resin, from about 40 to about 100 parts by weight of a heat resistant filler and from about 86 to about 260 parts by weight of a reinforcement material.

A blend useful for forming prepreg roving, for example, may include from about 50 to about 74 parts by weight of silsesquioxane, from about 9 to about 25 parts by weight of silanol terminated polydiorganosiloxane, from about 17 to about 25 parts by weight of methylsiloxane resin, from about 0 to about 5 parts by weight of a heat resistant filler and from about 315 to about 400 parts by weight of a reinforcement material.

It will be appreciated that the amount of each material added to the final composition will vary depending upon the end use of the composition, and the desired characteristics and properties thereof. For example, TABLE I hereinbelow provides different exemplary composition amounts for various end-use applications.

Additional examples of useful compositions according to the present invention are provided in TABLE I hereinbelow. In TABLE I, the term "tacky" is used to describe the characteristic of the composition that a ply formed therefrom is capable of adhering to a like ply at room temperature, substantially without delaminating therefrom. The term "dry" denotes a composition, a ply of which will not adhere to a like ply. TABLE I shows the compositions components in parts by weight.

TABLE I

EXEMPLARY COMPOSITIONS SILICONE POLYMER (PARTS BY WEIGHT)

| First Polymer | Second | Filler[1] | Reinforcement | Application |
|---|---|---|---|---|
| 72 | 28 | 0 | 0 | Translucent panels |
| 40 | 20 | 40 | 0 | Bulk Molding Compound |
| 13 | 7 | 80 | 0 | Bulk Molding Compound |
| 27 | 10 | 18 | 45 (glass mat) | Tacky Prepreg |
| 25 | 8 | 18 | 50 | Dry Prepreg |
| 20 | 15 | 0 | 65 (glass fabric)[2] | Tacky Prepreg |
| 22 | 8 | 0 | 70 | Dry Prepreg |
| 22 | 10 | 15 | 53 (glass fabric)[2] | Tacky Prepreg |
| 24 | 7 | 12 | 57 | Dry Prepreg |
| 25 | 10 | 40 | 25 | Dry Prepreg |

[1]Silica
[2]Appropriate with graphite, Kevlar, silica, quartz, 2-dimensional fabric reinforcements and the like.

(Note that the compositions of Table I above which refer to filler and/or reinforcement, report the amounts thereof as weight percentages rather than parts per hundred parts resin.)

The blend, in the form of a resin film or prepreg, may be prepared and processed into a desired shape by conventional means such as by molding, extruding, pressing or the like. The shaped blend may then be cured or at least partially cured, such that at least one of the silicone polymers is cured. This provides the shaped blend with structural integrity, and it may then be utilized or affixed to an article as desired, such as by adhesive bonding or the like. Curing may be by any conventional means for the polymer used, such as chemical curing or heat curing. The blend is preferably cured at a temperature below its ceramitization temperature.

Curing of the polymer blend may be by any conventional method or technique. It is preferred however, to employ a chemical crosslinking catalyst or curing agent. As will be appreciated by those skilled in the art, the specific catalyst employed will vary depending upon the nature of actual polymers to be cured. Further, it will also be appreciated that the polymers can be heat cured without the use of a chemical catalyst.

Preferred methods and/or catalysts for use to crosslink silicone polymers according to the present invention include condensation catalysts. It will be appreciated that by providing the silicone polymers of the invention with proper reactive groups, other catalysts and initiators can also be employed, such as for example, silane-olefin addition (hydrosilation) catalysts; free radical catalysts such as peroxide catalysts; heat; and, exposure to ultraviolet light radiation.

For example, a free-radical catalyst such as a peroxide can be used as a blend-curing agent or catalyst when the silicone polymers contain a vinyl group. An example of such a silicone is as follows:

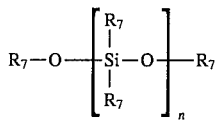

wherein $R_7$ is a vinyl group and "n" is as previously defined. Such silicones can also be catalyzed with ultraviolet light radiation.

When the silicone polymers have —Si—H groups in the terminal positions, or when the polymers have terminal double bonds, a silane-olefin addition catalyst is useful.

Silicone compounds with hydroxy groups such as those in the silanol terminated polydiorganosiloxanes described above, including silanol stopped ("terminated") polydimethyl siloxane, can also be catalyzed with heat.

The preferred curing system includes a condensation reaction. A silica acid ester, such as tetraethylsilicate, reacts with the hydroxyl end groups of the diorgano polysiloxanes of the invention composition in a condensation reaction. The reaction results in the release of an alcohol, and the reaction is catalyzed with a metal soap such as for example, dibutyltindilaurate.

A still more preferred catalyst is an organo-zinc compound, such as zinc hexanoic acid. A preferred amount of this catalyst is from about 0.01 to about 1.0 percent by weight of the resin blend, and more preferably, from about 0.1 to about 0.5 percent by weight. The exact amount of catalyst of course, will vary depending upon the end use application of the composition.

It is believed that the condensation catalyst such as zinc hexanoic acid, catalyzes the condensation reaction of the silanol end groups present in the silanol terminated polydiorganosiloxane and the residual hydroxy (silanol) groups believed to be present in the polydimethylsiloxane polymer and in the methylphenylsesquisiloxane. The reaction is preferably carried out at from about 350°–400° F. The reaction temperature is not critical to the invention, and can be lower if more catalyst is used. The reaction causes the silicone composition to gel and form a 3-dimensional polymer network. The starting silicone compositions do not necessarily require a curing agent, and may be cured with heat alone through the condensation of silanol and hydroxy groups, as previously discussed.

Crosslinking between the first and second silicone polymers provides structural integrity to the composite by forming a rigid 3-dimensional network. It is preferred to use an effective amount of the crosslinking catalyst. Because the amount of curing required will vary depending upon the end use of the materials according to the present invention, the "effective amount" of the crosslinking catalyst will vary. An example of an effective amount of the crosslinking catalyst is from about 0.05 to about 5 percent by weight, and more preferably, about 0.1 to about 3 percent by weight, based upon the total weight of the resin blend and the filler if employed.

Alternatively, the blend may be coextruded, laminated or otherwise affixed or applied to an article prior to curing. After being affixed to the article, the blend may be cured. The curing of the blend may provide adhesion to the article.

Preferably, the article itself is curable, and the blend and the article are co-cured.

Upon exposure to high temperatures, such as above about 1100° F. (590° C.), at least one of the silicone polymers ceramitizes. As a ceramic, the inventive material provides high temperature and thermal shock resistance, as will be exemplified hereinbelow.

The blend according to the invention may be laminated to a fabric or the like, or may be otherwise conventionally processed to form an article, prior to curing. Similarly, the blend according to the present invention may form a component of a composite, wherein the composite is to have the desired structural and thermal properties of the inventive blend. Composite parts according to the invention can be fabricated as aircraft parts or thermal protection structures, at mild process conditions and with a minimum of scrap due to the need for little or no machining.

Furthermore, as will be demonstrated hereinbelow, the materials according to the present invention have improved resistance to thermal shock as compared to other silica based materials heretofore known in art. The present materials are capable of withstanding sudden, substantially instantaneous exposure to high temperatures. For example, sudden exposure to temperatures increasing from ambient to as high as 4000° F. in five seconds are contemplated. It is the inventors' belief that as the heat is applied to the invention materials, the organosilane components thereof begin to decompose at these temperatures, and that the decomposition products react resulting ultimately in a ceramic i.e., silica material. The materials are shown to be ceramic because of the absence of organic groups. The thermally induced stresses that are present in the material due to any temperature gradient which develops due to the thermal shock, are compensated for by the decomposition of the organic constituents in the material. That is, the volumetric increase caused by thermal growth, is compensated for by the shrinkage of the decomposing organic components. The thermally induced stresses are thereby effectively neutralized and the material does not crack.

In general, a resin blend is first prepared by mixing the silicone polymers and optionally, a catalyst and the filler as discussed hereinabove. This resin blend is then used to impregnate reinforcing fibers, in any of the variety of forms discussed hereinabove. An impregnated fiber of this nature is commonly known as a "prepreg". At this point preferably, substantially no chemical reaction of the polymers in the resin blend has occurred.

A number of plies of prepreg is then taken and assembled. The prepreg stack is preferably cured at temperatures of at or above about 350° F. to 400° F., or lower if more catalyst is used, and preferably below about 1100° F., and under pressure using either a compression mold or autoclave mold and the like, as is conventional in the art. The result is called a composite laminate. The materials of the present invention are capable of being formed into complex shapes by this method.

It has been unexpectedly found that a wide range of pressures can be employed in forming the laminate structures according to the invention. The viscosity curves of the invention compositions are generally low, such that low amounts of pressure will compact the invention compositions.

It has also been unexpectedly found that during curing, the compositions according to the present invention do not have an exotherm. As is common with many materials such as various epoxy compounds, an exotherm is present during curing. Such exotherms often promote internal stresses in the materials being processed. Because the present compositions cure without an exotherm, thick layers of composition may be formed without danger of exotherm induced stress failures.

The composite laminate, when exposed to temperatures above about 1100° F. (590° C.), will be converted from the silicone organic polymer to the silica ceramic by the decomposition of the organic polymer, reaction with by-product silicon in situ, and the evolution of water and carbon containing volatiles. The exposure to high temperature may be carried out by firing the material at higher temperatures (above about 1100° F.) prior to its intended application, or exposing the composite to high temperatures while in its intended application.

It has also been unexpectedly found that compositions according to the present invention can be successfully co-cured with other materials such as epoxies, bismaleimides, polyimides and phenolic composites, often used in the formation of structural composites. The structural composite elements fabricated from epoxies, bismaleimides, polyimides, polyesters and phenolic materials will generally not withstand localized high temperature flames. By having a layer of a composition according to the present invention co-cured thereto to form a lamination, high temperature resistance is effectively imparted to the structural composite.

It has been further unexpectedly found that even after being subjected to high temperatures, as will be exemplified hereinbelow, the invention composition remains laminated to the structural material. Thus, even after being exposed to a high temperature, laminate structures according to the present invention retain high temperature resistance because the invention material remains laminated thereto.

The compositions according to the present invention are generally translucent, particularly if no filler material is employed. Such compositions can be employed to fabricate high temperature and thermal shock resistant window structures.

Target properties for the blend and composites of the present invention include high thermal stability and resistance to thermal shock and extended lifetimes at operating temperatures and conditions. These properties include resistance to erosion and mass loss when subjected to high levels of heat flux and particle laden flame, maintenance of electrical properties over a wide temperature range, compliance and sealing ability prior to ceramitization (as in gasket applications), and thermal performance and mechanical integrity over time.

SPECIFIC EXAMPLES

In order to exemplify blends according to the present invention, the constituents of TABLE II hereinbelow were mixed in a hot-melt, solventless mixer. The mix was then hot-melt filmed onto release paper and impregnated with 81 parts by weight of glass fibers per 100 parts by weight of resin blend.

TABLE II

| BLEND COMPONENTS | |
| --- | --- |
| Components | Amount[a] |
| Second silicone[b] | 36 |
| First silicone[c] | 32 |
| Filler[d] | 32 |
| | 100 |

[a] parts by weight;
[b] a polydiorganosiloxane having a nominal viscosity of about 400 cp;
[c] a silsesquioxane having a nominal viscosity of from about 500,000 to about 1,000,000 cp;
[d] silica From the fiber reinforced film, prepreg sections were cut and laid up in a conventional manner. The prepreg stack was cured in a press mold at 350° F. for 120 minutes, at from about 15 to about 2000 psi. The cured prepreg (composite laminate) may optionally be subjected to a postcure at 500° F.

The prepreg was then tested to determine composite properties, ablative performance and mechanical properties, as will be discussed hereinbelow.

In order to determine composite properties of the prepreg, samples prepared according to the procedure set forth above were subjected to thermogravimetric analysis (TGA) at a heating rate of 20 degrees fahrenheit per minute. Results of the TGA are reported in TABLE III hereinbelow.

TABLE III

THERMOGRAVIMETRIC ANALYSIS

| Temperature Range | Weight Loss, Percent |
|---|---|
| Room temperature - 500° F. | 2% (1% with postcure) |
| 500–1300° F. | 11% |
| 1300–1800° F. | 0% |

These results show that there was no weight loss at temperatures above 1300° F. Hence, blends according to the invention possess high temperature resistance.

To determine the resistance to erosion and mass loss performance of the composite, samples were subjected to exposure to a kerosene/oxygen supersonic, high temperature flame containing alumina particles. The composite was heated to 4200° F. and held at this temperature for six seconds. Weight loss was determined to be 0.5 percent. For comparison, MXBE350 phenolic resin composite material available from Fiberite, Inc., was subjected to the same ablative test. Weight loss was determined to be 7.2 percent.

In the same test, erosion was measured at 0.015 inches. For comparison, MXBE350 material was subjected to the same test, resulting in an erosion of 0.4 inches.

To demonstrate the mechanical or structural properties of the cured, non-ceramitized composite according to the present invention, the resin blend of TABLE II was reinforced in 120 style E-glass fabric available commercially, for example, from Owens Corning. A stack of thirty plies of the prepreg was cured at 375° F. and 50 psi. The material was then tested for various mechanical properties as shown in TABLE IV and according to the ASTM tests listed therein.

Additional similar tests were also conducted, comparing the silicone composites of the present invention to control materials. For example, additional erosion resistance tests at various heat flux conditions and with various amounts of alumina particles in the flow were conducted as shown in TABLE V. For comparison, MXBE350 composite material was again used as the control. Erosion in inches and mass loss in grams was determined throughout the tests. In TABLE V, a negative number indicates an increase in the mass of the test specimen, indicative of a swelling of the material and/or a deposit on the test specimen from the particulate material in the test flame.

TABLE V

EROSION AND MASS LOSS

| Heat Flux (Btu/ft$^2$·s$^a$) | Alumina Particle Flow (lb./h) | Control Peak Erosion (in) | Invention Composite Peak Erosion (in) | Control Mass Loss (g) | Invention Composite Mass Loss (g) |
|---|---|---|---|---|---|
| 262.00 | 0.00 | −0.0120 | −0.007 | 2.50 | 1.60 |
| 683.00 | 0.00 | 0.0380 | −0.004 | 6.90 | 1.90 |
| 1093.00 | 0.00 | 0.1350 | 0.024 | 10.00 | 2.20 |
| 262.00 | 10.00 | 0.1270 | 0.008 | 10.00 | 1.30 |
| 683.00 | 10.00 | 0.2300 | 0.021 | 11.00 | 1.10 |
| 683.00 | 10.00 | 0.2270 | 0.030 | 10.80 | 1.60 |
| 683.00 | 10.00 | 0.2120 | 0.036 | 10.60 | 2.20 |
| 1093.00 | 10.00 | 0.3180 | 0.072 | 10.90 | — |
| 262.00 | 20.00 | 0.1620 | 0.017 | 11.90 | 1.80 |
| 683.00 | 20.00 | 0.2800 | 0.021 | 13.10 | — |
| 1093.00 | 20.00 | 0.3660 | 0.049 | 13.10 | 2.20 |

$^a$second

As shown in TABLE V, the silicone composite materials of the present invention showed less erosion and mass loss under a wide range of flame severities, as compared to the control phenolic resin composite materials, and thereby, showing the oxidation resistance of the invention composites.

A burn-through test was also conducted by subjecting similarly dimensioned materials to a 3300° F. flame at a pressure of 250 psi to simulate a commercial jet engine heat shield exposure. The phenolic composite showed a burn-through after 80 seconds, while the silicone composite of the present invention exhibited no burn-through after 180 seconds complying with proposed Federal Aviation Administration (FAA) regulations. In contrast, a conventional heat

TABLE IV

MECHANICAL PROPERTIES

| ASTM Test | Test of Mechanical Property | Units | Room Temperature | After 2 hrs. at 500° F. Tested at Ambient | After 1/2 hrs. at 750° F. Tested at Ambient |
|---|---|---|---|---|---|
| D638 | Tensile Strength | ksi$^a$ | 35.8 | 33.4 | 23.1 |
|  | Tensile Modulus | msi$^b$ | 2.4 | 2.5 | 2.1 |
| D790 | Flex Strength | ksi | 15.9 | 18.8 | 11.7 |
|  | Flex Modulus | msi | 1.74 | 1.92 |  |
| D695 | Compression Strength | ksi | 9.7 | 11.3 | 6.5 |
|  | Compression Modulus | msi | 2.2 | 2.3 |  |
| 3846 | Shear Strength | ksi | 1.4 | 1.98 | 0.5 |

$^a$thousands of pounds per square inch
$^b$millions of pounds per square inch

The specific gravity of the composite laminate of TABLE IV was determined to be 1.55 at room temperature and 1.52 after one-half hour at 750° F. when tested at ambient temperature.

shield of refractory fibers encased in a loose aluminum blanket exhibited burn-through in 6 seconds.

Additional burn-through tests were also conducted on composite panels having one or more layers formed from compositions according to the present invention, laminated to two or more layers of bismaleimide carbon fiber-based composite. The invention compositions were prepared substantially according to the formulation of TABLE II hereinabove, with the addition of reinforcing fibers as will be set forth hereinbelow. As will also be set forth below, the composite panels included a number of layers of a bismaleimide carbon fiber composite fabric available from BP Chemicals (Hitco) Inc. The resin employed is V-388 from BP Chemicals (Hitco) Inc. and the fibers are AS4 fibers from Hercules, Inc. The number of layers in each composite panel, as well as the fiber reinforcement employed, are listed in TABLE VI hereinbelow.

TABLE VI

COMPOSITE PANEL BURN-THROUGH TEST

| Panel No. | A | B | C | D |
|---|---|---|---|---|
| Number of Plies: | | | | |
| V-388 resin/AS4 fibers | 4 | 4 | 4 | 2 |
| Invention Composition | 1 | 2 | 3 | 2 |
| Reinforcement In: | | | | |
| Invention Composition | glass fibers | glass fibers | glass fibers | carbon fibers |

Each of the panels as set forth in TABLE VI was subjected to a 2000° F. flame for 15 minutes, with the flame being directed toward the side of the composite panel having the invention layers thereon. Other test parameters included an air flow rate of 233 feet/second at a pressure of 6.3 psi for 5 minutes and 138 feet/second at a pressure of 2.6 psi for 10 minutes.

No flame penetration was observable on the side of each panel opposite the invention layer. Panel Nos. B, C and D showed substantially no delamination, and no other observable damage to the side of the panel to which the flame was applied.

A further application that demonstrates the capability of the silicone composite in a high performance application is that of aerospace vehicle radomes. A radome protects sensitive electronic instruments such as the antenna assembly of radar sets from the high temperatures experienced in flight. Radomes need to have high temperature capability, have low dielectric constants which are stable throughout the operational temperature range, and be insulators. For vehicles travelling at high speeds, radome temperatures can approach 750° F. (for short times, however). Composite radomes used in such applications are normally based on polyimide resin matrices. Composites based on silicone resins, according to the present invention, offer several advantages, as demonstrated in TABLE VII hereinbelow.

TABLE VII

SUITABILITY OF SILICONE RESIN COMPOSITES FOR RADOME APPLICATIONS

| | RESIN MATRIX | |
|---|---|---|
| PROPERTY | Polyamide | Silicone |
| Composite Processability | Difficult long and high temperatures cure cycles 6 hours at 600° F. | Easy 2 hours at 375° F. |
| Temperature Capability | RT → 600° F. | RT → 2000° F. |
| Dielectric Cont. RT | 3.7 | 3.75 |
| Dielectric Cont. 750° F. | Not measured | 3.54 |
| Loss Tangent, RT | .01 | .01" |
| Loss Tangent 750° F. | Not measured | .006 |

RT = Room Temperature

The high performance, processable and high temperature characteristics of the silicone resin based composites are according to the invention also exemplified in gasket applications. In the cured form, the silicone resin based composites can be heated above its glass transition temperature ($T_g$), where it will become relatively soft and compliant, which are necessary properties for a gasket. After component assembly and subsequent exposure to high temperatures, the silicone composite undergoes ceramitization, thus, providing excellent thermal stability. Prototype gaskets have undergone successful engine testing. High temperature gaskets can also be used for applications in the oil and chemical industry, in general.

It will be appreciated that blends according to the invention have applications beyond those already discussed. As examples, TABLE VIII contains a number of blends according to the invention, and the amounts thereof, as may be useful for a number of applications which are also listed. In TABLE VIII, the silicone resins are shown in parts by weight. The total amount of silicone resins form the "resin mix". The filler and reinforcement materials are shown in parts per 100 parts of the resin mix.

TABLE VIII

APPLICATION OF SILICONE RESIN COMPOSITES

| | Silicone Resin Type (Parts by Weight) | | | | | |
|---|---|---|---|---|---|---|
| No. | Silsesquioxane | Silanol terminated PDMS[a] | Methyl siloxane resin | Filler (Parts/100 parts of resin mix) | Reinforcement (Parts/100 parts of resin mix) | Application |
| 1 | 50 | 34 | 16 | 354 | 0 | Bulk Molding Compound |
| 2 | 50 | 34 | 16 | 100 | 0 | Bulk Molding Compound |
| 3 | 50 | 34 | 16 | 375 | 25 | Lightweight Prepreg |
| 4 | 64 | 24 | 12 | 100 | 27 | Prepreg |
| 5 | 65 | 23 | 12 | 47 | 20 | Resin Rich Prepreg |
| 6 | 67 | 11 | 22 | 100 | 86 | Composites for Thermal Protection |

TABLE VIII-continued
APPLICATION OF SILICONE RESIN COMPOSITES

| | Silicone Resin Type (Parts by Weight) | | | | | |
|---|---|---|---|---|---|---|
| No. | Silsesquioxane | Silanol terminated PDMS[a] | Methyl siloxane resin | Filler (Parts/100 parts of resin mix) | Reinforcement (Parts/100 parts of resin mix) | Application |
| 7  | 65 | 23 | 12 | 47 | 120 | Composites for Thermal Protection |
| 8  | 65 | 23 | 12 | 46 | 145 | Ablative Protection |
| 9  | 65 | 23 | 12 | 46 | 179 | Heavy Prepreg - Ablative Protection |
| 10 | 65 | 23 | 12 | 40 | 260 | Structural Ceramics |
| 11 | 74 | 9  | 17 | 5  | 315 | Prepeg Roving |
| 12 | 90 | 5  | 5  | 0  | 186 | Electronic Composites |
| 13 | 50 | 25 | 25 | 0  | 400 | Prepeg Roving |

[a] polydimethylsiloxane

In addition to the applications noted above, such materials according to the invention have utility in, for example, the protection of building exteriors. Translucent panels are often used as exterior walls in certain buildings and the like. These panels provide ease of assembly and diffuse light to the interior of the building. Such panels are generally constructed from polyester sheets separated by a glass mat and surrounded by an aluminum frame. The compositions according to the invention are useful to improve the fire resistance of such panels. In one test, a film of a composition according to the present invention was applied to such a panel. A control panel without the film and the coated panels were tested according to ASTM E119 which included subjecting panels to a flame which ramps up from 1000° F. to 1750° F. in one hour. After the ramping to 1750° F., the panel is held at 1750° F. for two hours. The control panel burned through consistently during the ramp up in from 20 to 45 minutes, at about 1400° F., while the panel with the inventive film applied thereto did not burn through until 120 minutes or longer after 1750° F. had been reached, corresponding to a 2 hour fire rating.

In another test with respect to burn through, an aluminized blanket material, similar to that discussed above, and a material according to the present invention were subjected to a 3300° F. flame at a pressure of 250 pounds per square inch (psi). The aluminized blanket showed a burn through after 6 seconds, while that of the present invention did not burn through until 118 seconds. At 4200° F. and a pressure of 150 psi, a control phenolic composite material burned through after 80 seconds, while the material according to the present invention showed no burn through at 180 seconds. The materials according to the invention, by virtue of there ease of fabrication are capable of being used to protect structures such as heat pipes or the like in high temperature environments, for example, in commercial jet engines.

The invention is also useful in high temperature tooling for the manufacture of composites. Such tools are usually manufactured from metal alloys. For the fabrication of high temperature advanced composites, for example, those based on for example, bismaleimide and polyimide resin matrices, high temperature refractory metal, tools need to be used. Such metal tools have a number of drawbacks. By comparing the various properties of conventional metal tooling to silicone composite tooling according to the invention, the drawbacks of the metal tools and the advantages of the inventive tools are shown. Table IX contains a listing of various properties necessary for such tooling, and a comparison of conventional metal tooling with tooling according to the present invention.

TABLE IX
SUITABILITY OF SILICONE RESIN COMPOSITES FOR HIGH TEMPERATURE TOOLING

| Property | Conventional Metal Tooling | Silicone Composite Tooling |
|---|---|---|
| Temperature Capability | 750° F. | 750° F. |
| Vacuum Integrity | Excellent | Good |
| Weight | Heavy | Light |
| Corrosion Resistance | Poor | Good |
| Ease of Repair | Poor | Good |
| Heat-Up/Cool Down | Slow | Fast |
| Cost | High | Low |

It has also been found that composites according to the present invention possess low fire, smoke and toxicity (FST) properties. Silicone matrix resin composites according to the invention, are ideally suited for applications that require high FST resistant properties. The ability of the inventive materials to be co-cured with other composites is also desirable in this application. Incorporation of a layer of the inventive material onto a structural composite can improve the FST properties thereof. Table X lists the results of heat release testing in this regard.

TABLE X
RESULTS OF HEAT RELEASE TESTING

| Material Reinforcement | Peak Heat Release (kW/m$^2$) | Time to Peak Heat (S) | Total Heat Release (At 2 min) (kW/m$^2$) |
|---|---|---|---|
| AS4 3K PW carbon | 13.3 | 232 | −3.0 |
| Silica Fabric | 15.5 | 248 | −3.2 |
| Glass Fabric | 11.1 | 234 | −4.6 |
| Glass Mat | 27.7 | 206 | −3.3 |
| Max Allowable | 65 | — | 65 |

As briefly discussed above, the processability, high temperature properties, and low dielectric constant make the invention materials favorable for several applications requiring such electrical properties. For example, the mechanical, physical, thermal and electrical properties in particular make the silicone matrix composites according to the invention attractive candidates for the fabrication of printed circuit boards. Table XI below shows examples of silicone matrix laminates according to the invention and the electrical properties thereof. These materials were tested according to ASTMD250-86(90). According to that test, the frequency of testing was 9.375 GHz and the material was tested at room temperature.

TABLE XI

ELECTRICAL PROPERTIES OF SILICONE LAMINATES

| Specimen | Thickness (cm) | Wavelength Co-efficient | Dielectric Constant | Loss Tangent |
|---|---|---|---|---|
| 1 | 1.250 | 0.7406 | 3.97 | 0.009 |
| 2 | 1.248 | 0.7352 | 3.94 | 0.011 |
| 3 | 1.500 | 0.7717 | 3.12 | 0.024 |
| 4 | 1.503 | 0.7544 | 2.99 | 0.020 |

In Table XI above, Specimens 1 and 2 were reinforced with glass fabric while Specimens 3 and 4 were reinforced with silica fabric.

It is known in the industry that increasing the density of components on a printed circuit board is an advantage. However, increasing density causes thermal management problems. Use of the silicone based composites according to the present invention offers advantages due to the low loss tangent relative to conventional printed circuit board materials. A comparison of loss tangent on composite materials used in printed circuit boards is reported in Table XII hereinbelow.

TABLE XII

COMPARISON OF LOSS TANGENT ON COMPOSITE MATERIALS USED IN PRINTED CIRCUIT BOARDS

| Materials | Loss Tangent |
|---|---|
| Epoxy | 0.15 |
| Polyimide | 0.09 |
| Silicone | 0.01 |

The silicone materials according to the invention, as reported in TABLE XII, showed the lowest loss tangent.

Thus it is shown that the present invention includes blends, composites, articles and methods which are highly effective in providing high temperature and thermal shock resistance. Furthermore, the materials of the present invention are processable by conventional techniques. For example, prepreg can be laid up by hand, followed by compression molding, normally at high pressures of up to 2000 pounds per square inch (psi) or higher; autoclave molding which is normally run at pressures of from about 100 to about 200 psi; shrink tape molding at low pressures of about 7 psi; and filament winding at zero or ambient pressures. All such moldings may be accomplished with the application of heat.

Based upon the foregoing disclosure, it is now apparent that the blends, composites, articles and methods described herein carry out the objects of the invention set forth hereinabove. It is, therefore, to be understood that any variations fall within the scope of the claimed invention and thus, the selection of specific component elements and processing conditions can be determined without departing from the spirit of the invention herein disclosed and described. In particular, specific silicone components, fillers, reinforcements, amounts thereof and the like, according to the present invention are not necessarily limited to those discussed and exemplified. Thus, the scope of the invention includes all modifications, equivalents and variations that fall within the scope of the attached claims.

What is claimed is:

1. A cured article comprising a cured silicone blend, wherein said silicone blend comprises:

a first silicone polymer component comprising at least one silsesquioxane, and a second silicone polymer component comprising at least one polydiorganosiloxane;

wherein the blend is ceramitizable at a temperature above about 1100° F.;

and wherein at 25° C. said first silicone polymer component has a viscosity of about 500,000 centipoise and above and said second silicone polymer component has a viscosity of from about 10 to about 1000 centipoise;

wherein said polydiorganosiloxane is selected from the group consisting of silanol terminated polydiorganosiloxane, methyl terminated polydiorganosiloxane and mixtures thereof.

2. A translucent panel comprising the cured article of claim 1, wherein the first silicone polymer component is present in the amount of 72 parts by weight, and the second silicone polymer component is present in the amount of 28 parts by weight.

3. An electronic circuit board comprising the cured article of claim 1, wherein the silicone resin blend comprises:

a) about 90 parts by weight of silsesquioxane, b) about 5 parts by weight of a silanol terminated polydiorganosiloxane, c) about 5 parts by weight of methyl terminated polydiorganosiloxane, and d) fibrous reinforcement.

4. The electronic circuit board of claim 3 wherein said reinforcement is selected from the group consisting of glass fabric, silica fabric, and mixtures thereof.

5. The cured article of claim 1 comprising a gasket.

6. A composite comprising the cured article of claim 1 useful for at least one of thermal protection, ablative protection, structural components and tooling, wherein the silicone resin blend further comprises:

a heat resistant filler selected from the group consisting of inorganic oxides, inorganic carbides, inorganic nitrides and mixtures thereof, at least one of a fibrous and a felt reinforcement selected from glass, quartz, silica, and carbon, aluminosilicate, amide, and mixtures thereof.

7. The composite of claim 6 comprising:

a) about 32 to about 67 parts by weight of silsesquioxane, b) about 11 to about 36 parts by weight of silanol terminated polydiorganosiloxane, c) about 12 to about 36 parts by weight of methyl terminated polydiorganosiloxane, d) about 32 to about 100 parts per hundred parts resin of the heat resistant filler, and e) about 81 to about 260 parts per hundred parts resin of the reinforcement.

8. The composite of claim 6 comprising:

a) about 65 to about 67 parts by weight of silsesquioxane, b) about 11 to about 23 parts by weight of silanol terminated polydiorganosiloxane, c) about 12 to about 22 parts by weight of methyl terminated polydiorganosiloxane, d) about 40 to about 100 parts per hundred parts resin of the heat resistant filler, and e) about 86 to about 260 parts per hundred parts resin of the reinforcement.

9. The composite of claim 6 further comprising a laminate of said silicone resin blend and a co-cured composite of a resin selected from the group consisting of bismaleimides, epoxies, phenolics, and polyimides.

10. The composite of claim 9, wherein the reinforcement of the silicone resin blend is selected from the group consisting of carbon fibers, silica fabric, glass fibers, glass fabric, glass mat and mixtures thereof.

11. The composite of claim 9 further comprising a laminate of the silicone resin blend and a bismaleimide/carbon fiber composite.

12. The composite of claim 11 wherein the reinforcement of the silicone resin blend is selected from the group consisting of glass fibers and carbon fibers.

13. The composite of claim 6 comprising an aerospace vehicle radome.

14. The composite of claim 6 comprising a heat shield.

15. The composite of claim 6 comprising a heat pipe.

16. The cured article of claim 1, wherein the methyl terminated polydiorganosiloxane is methyl terminated polydimethyl siloxane.

17. The cured article as in claim 1, further comprising an effective amount of a blend-curing catalyst selected from the group consisting of condensation catalysts; silane-olefin addition catalysts; and, free radical catalysts.

* * * * *